J. MACKEY.
ROTARY MOTOR.
APPLICATION FILED FEB. 27, 1911.

1,006,859.

Patented Oct. 24, 1911.
2 SHEETS—SHEET 1.

WITNESSES
L. H. Schmidt.
C. E. Trainor

INVENTOR
JAMES MACKEY,
BY Munn & Co.
ATTORNEYS

J. MACKEY.
ROTARY MOTOR.
APPLICATION FILED FEB. 27, 1911.

1,006,859.

Patented Oct. 24, 1911.
2 SHEETS—SHEET 2.

WITNESSES
L. H. Schmidt
C. E. Train

INVENTOR
JAMES MACKEY,
BY Munn & Co.
ATTORNEYS

UNITED STATES PATENT OFFICE.

JAMES MACKEY, OF STEAMBOAT SPRINGS, COLORADO.

ROTARY MOTOR.

1,006,859.   Specification of Letters Patent.   Patented Oct. 24, 1911.

Application filed February 27, 1911. Serial No. 610,984.

*To all whom it may concern:*

Be it known that I, JAMES MACKEY, a citizen of the United States, and a resident of Steamboat Springs, in the county of Routt, State of Colorado, have invented a new and useful Improvement in Rotary Motors, of which the following is a specification.

My invention is an improvement in rotary motors, and consists in certain novel constructions and combinations of parts hereinafter described and claimed.

Figure 1:
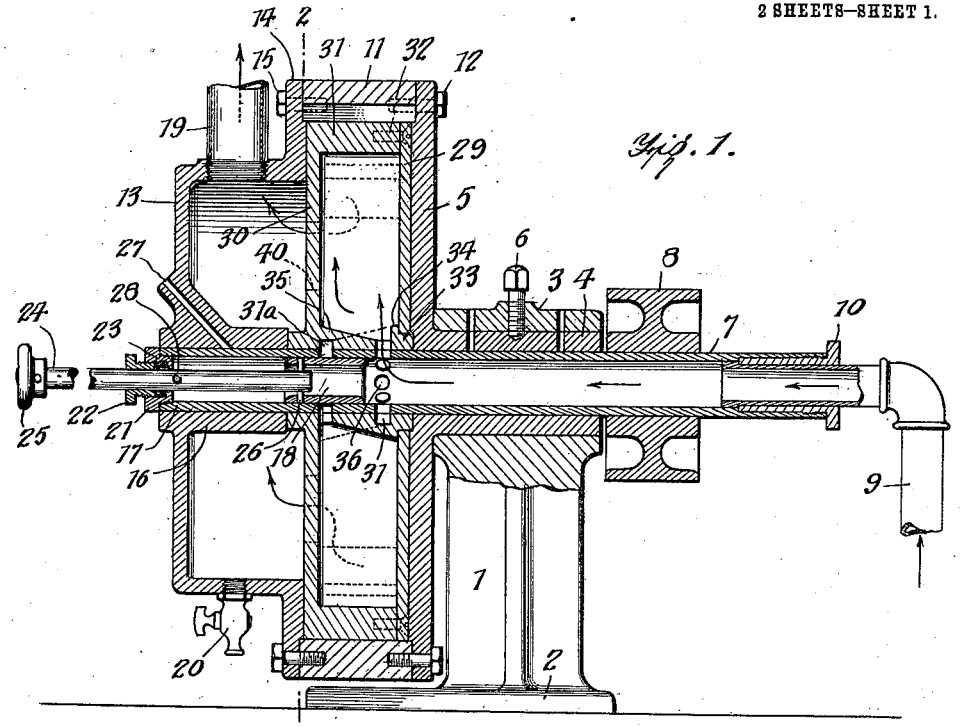
Figure 2:
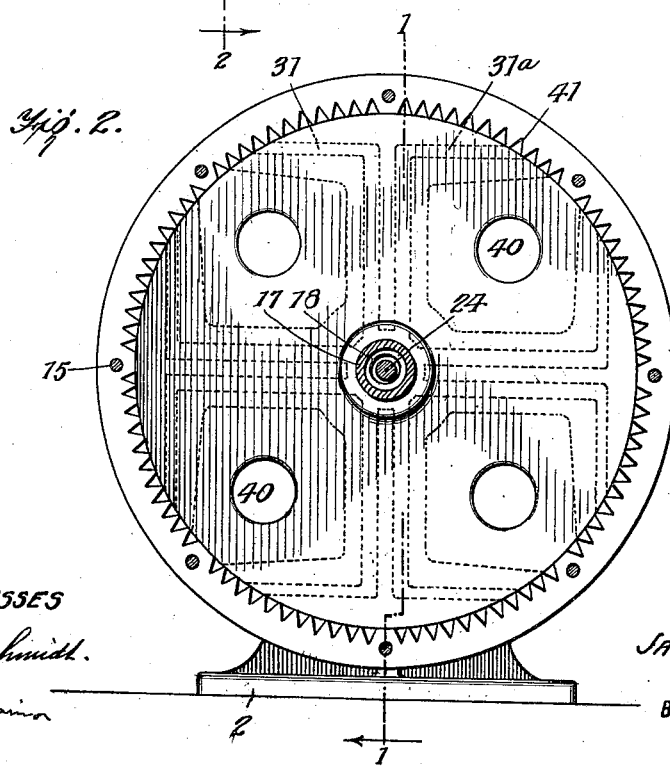
Figure 3:
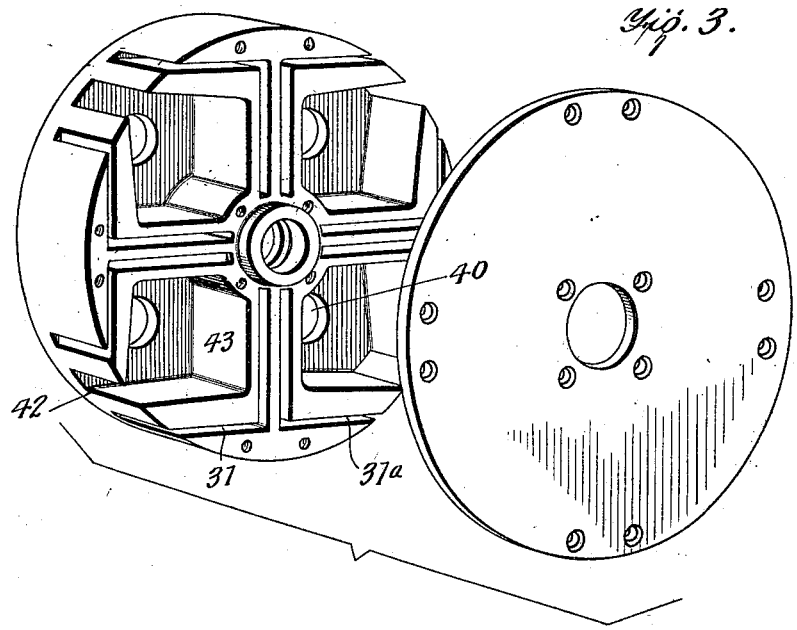
Figure 4:
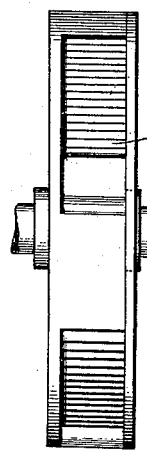
Figure 5:
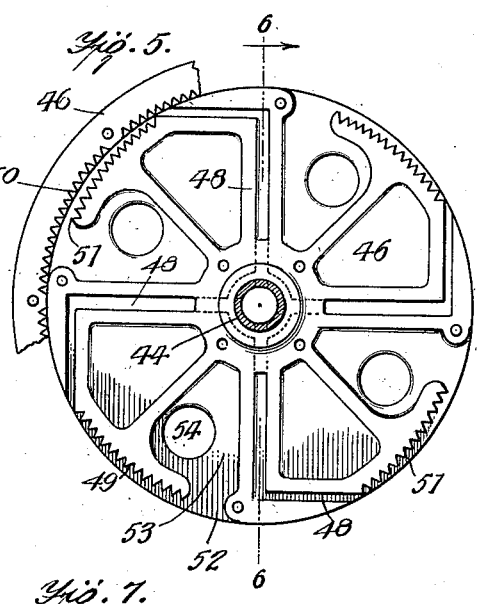
Figure 6:
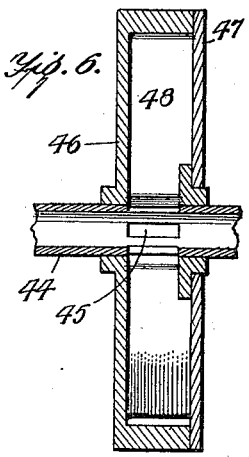
Figure 7:
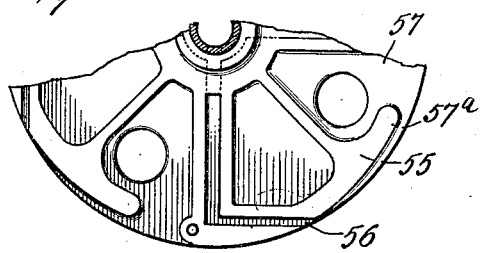

Referring to the drawings forming a part hereof: Figure 1 is a section on the line 1—1 of Fig. 2; Fig. 2 is a section on the line 2—2 of Fig. 1; Fig. 3 is a perspective view of the rotor; Fig. 4 is an edge view of a modified form; Fig. 5 is a face view of Fig. 4; Fig. 6 is a section on the line 6—6 of Fig. 5; and Fig. 7 is a partial face view of a rotor showing another modification.

The present embodiment of the invention comprises a standard 1 having a foot 2 by means of which it may be held to a support, and a bearing 3 in which is held the hub 4 of a disk 5 forming a part of the motor casing to be described, by means of a set-screw 6. The set-screw is threaded through an opening in the bearing and engages a recess in the hub.

A pipe or hollow shaft 7 is journaled in the hub, and a pulley 8 is secured to the shaft on the opposite side of the bearing from the disk 5. An inlet pipe 9 fits into the outer end of the hollow shaft and is held by a packing nut 10 threaded into the shaft.

The casing is completed by a ring 11 held co-axial with the disk by cap screws 12, and a supplementary or auxiliary casing 13 having an annular flange 14 connected to the ring by cap screws 15. The casing 13 is cylindrical in form and is open toward the disk 5 and is provided with a hub 16 in which is received the shaft 7.

The auxiliary casing is provided with an outlet pipe 19 and with a drain valve 20. A reducing sleeve 21 is threaded into the outer end of the shaft 7, and a packing nut 22 is threaded into the sleeve, a packing 23 being arranged between the nut and the sleeve. A valve 18 is slidable on the shaft and is operated by a rod extending through the packing.

The rod 24, provided with a knob 25, passes through the packing nut and a pin 26 connects the inner end of the rod with the valve 18. The hub 16 of the casing is provided with an inclined oil passage 27 leading from the outer face of casing to the periphery of the shaft and a pin 28 is passed through the rod 24 at the inner end of the sleeve.

The rotor comprises a disk 30 and a cover 29 held to the disk by cap screws 32. The disk 30 is provided with a plurality of series of discharge passages 31 and 31$^a$. The passages 31, Fig. 2, extend from the center of the disk parallel with a diameter of the disk to a point near the periphery of the disk where they bend laterally toward the periphery of the disk and discharge tangentially to the inner face of the ring 11.

The passages 31$^a$ extend in the same manner, but in the opposite direction. A bushing 33 encircles the shaft 7, and the cover 29 is provided with a central opening for receiving the bushing, and the bushing is provided with a radial flange 34 at its inner end abutting against the inner face of the cover.

The shaft 7 is provided with two annular series of openings 36 and 39, and the valve 18 when moved in the sleeve will open one series and close the other. The passages 31 and 31$^a$ are arranged alternately, and the passages 31 communicate with the openings 36, while the passages 31$^a$ communicate with the passages 39. The web of the disk 30 is provided with transverse passages 40 which permit the exhaust fluid to escape into the auxiliary casing 13.

It will be evident that when the motive fluid is admitted to the hollow shaft the said fluid will pass through the openings 36 and 39, depending upon the position of the valve 10, and will rotate the rotor in either direction, in accordance with the position of the valve. The inner surface of the ring 11 is provided with transverse notches 41, forming blades or vanes 38, against which the motive fluid impinges as it leaves the passages.

In operation, the valve 18 being in the position shown in Fig. 1, the motive fluid passes through the passages 31 and rotates the valve in the forward direction. When it is desired to reverse the rotor the valve 18 is moved to the right of Fig. 1, covering the passages 36 and uncovering the passages 39, so that the fluid passes through the openings 19, thus reversing the direction of rotation of the valve. The exhaust fluid (Fig. 3)

passes from the blades or vanes through openings 42 between the passages 31 and 31ᵃ into chambers 43 in the disk, and from the chambers through the openings 40 into the auxiliary casing 13 and through the exhaust pipe 19 to the atmosphere.

In Figs. 4, 5 and 6 the hollow shaft 44 is provided with but one series of openings 45 and the rotor, comprising a disk 46 and a cover 47, is provided with but one series of passages 48. The casing 46 is provided with blades or vanes 50, and the rotor is also provided with blades or vanes 51 in front of the outlet of each passage 48. A radial passage 52 is provided at the end of each series of blades 51, which opens into a chamber 53, and the disk has a transverse passage 54 for each chamber.

It will be noticed that the motor is provided with a passage 49 leading from the outlet or discharge end of each radial passage 48 to the passage 52, and that the said passages or ports 49 gradually increase in cross section from the said outlet or discharge end to the passages 52.

In the above mentioned construction no provision is made for reversing, so that the rotor moves in one direction. In Fig. 7 the blades 51 are omitted, the construction being otherwise the same. It will be noticed in Fig. 7 that a rib 55 is arranged on the face of the disk leading from the opening of the passage 56 to the chamber 57, and that the outer face of the rib inclines inwardly from the passage to the chamber. A passage or port 57ᵃ is thus provided leading from the discharge end of the radial passages to the chambers 57, and the said passages or ports 57ᵃ gradually increase in cross section from the outlet of the radial passage to the chamber. In Fig. 5 a similar rib 58 is provided which carries the blades 51. The said ribs are so arranged to permit the steam to expand.

I claim:

1. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the other series, the casing having blades against which the motive fluid from the passages impinges, the shaft having a plurality of series of radial passages for the said fluid, the series being spaced apart from each other, the members of one series communicating with one series of the radial passages of the rotor, and the members of the other series with the other series of radial passages, a valve in the shaft for closing either series of the passages of the shaft, the rotor having chambers between the radial passages for receiving the exhaust fluid from the blades, and having radial ports leading from a point adjacent to the discharge of the passages to the chambers, said ports gradually increasing in cross section toward the chambers, the rotor having transverse openings leading from the chambers to the exhaust chamber.

2. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the other series, the casing having blades against which the motive fluid from the passages impinges, the shaft having a plurality of series of radial passages for the motive fluid, the series being spaced apart from each other, the members of one series of the passages of the shaft communicating with one series of passages of the rotor, and the other series of the shaft communicating with the other series of the rotor, a valve in the shaft for closing either series of the passages of the shaft, the rotor having chambers between the radial passages for receiving the exhaust fluid from the blades, the rotor having openings leading from the chamber to the exhaust chamber.

3. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the other series, the casing having blades against which the motive fluid from the passages impinges, the shaft having a plurality of series of radial passages for the said fluid, the series being spaced apart from each other, the members of one series communicating with one series of passages of the rotor, and the other series with the other passages, a valve in the shaft for closing either series of the passages of the shaft, the rotor having ports for conducting the motive fluid to the exhaust chamber after it has acted on the blades, said ports gradually increasing in cross section toward the chamber.

4. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the members of the other series, the casing having blades against which the motive fluid from the passages impinges, the shaft having a plurality of series of radial passages for the motive fluid, the series being spaced apart from each other, the members of one series communicating with one series of passages of the rotor, and the other series with the other passages, a valve in the shaft for closing either series of the ports of the shaft, the rotor having passages for conducting the motive fluid to the exhaust chamber after it has acted on the blades.

5. A motor comprising a substantially cylindrical casing, a hollow shaft journaled in the casing, said casing having an auxiliary exhaust chamber at one side provided with an exhaust pipe, a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the other series, the casing having blades against which the motive fluid from the passages impinges, the shaft having a plurality of series of radial passages for the motive fluid, the series being spaced apart from each other, the members of one series communicating with one series of passages of the rotor, and the other series with the other passages, a valve in the shaft for closing either series of the passages of the shaft, the rotor having ports for conducting the fluid to the exhaust chamber after it has acted on the blades.

6. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the members of one series discharging in the opposite direction to the other series, the casing having blades against which the motive fluid from the passages impinges, the shaft having a plurality of series of radial passages for the motive fluid, the series being spaced apart from each other, the members of one series communicating with one series of passages of the rotor, and the other series with the other passages, and means for closing either of the series of passages of the shaft, the rotor having means for conducting the motive fluid to the exhaust chamber after it has acted on the blades.

7. A motor comprising a substantially cylindrical casing, a hollow shaft journaled in the casing, said casing having an auxiliary exhaust chamber at one side provided with an exhaust pipe, a standard having a bearing for the shaft, a rotor on the shaft, said rotor having a plurality of series of substantially radial passages leading from the center to its periphery and discharging against the inner face of the periphery of the casing and tangentially with respect thereto, the casing having blades against which the fluid impinges from the passages, the rotor having means for conducting the exhaust fluid to the exhaust chamber.

8. A motor comprising a substantially cylindrical casing having transverse blades on the inner face of its periphery, a hollow shaft journaled in the casing, a rotor secured on the shaft and having a plurality of series of substantially radial passages discharging against the blades tangential to the casing, the members of each series discharging in the opposite direction to the members of the other series, the shaft having an annular series of radial openings communicating with each series of passages, a valve slidable in the shaft for closing either series of openings, means for moving the valve, the rotor having chambers between the passages for receiving the exhaust fluid, and having ports leading from the discharge opening of the radial passages to the chambers, said ports gradually increasing in cross section from the radial passages to the chambers.

9. A motor comprising a substantially cylindrical casing having transverse blades on the inner face of its periphery, a hollow shaft journaled in the casing, a rotor secured on the shaft and having a plurality of series of substantially radial passages discharging against the blades tangential to the casing, the members of each series discharging in the opposite direction to the members of the other series, the shaft having an annular series of radial openings communicating with each series, a valve slidable in the shaft for closing either series, means for moving the valve, the rotor having chambers between the passages for receiving the exhaust fluid and having passages leading from the discharge opening of the radial passages to the chambers.

10. A motor comprising a substantially cylindrical casing having transverse blades on the inner face of its periphery, a hollow shaft journaled in the casing, a rotor secured on the shaft and having a plurality of series of substantially radial passages discharging against the blades tangential to the casing, the members of each series discharging in the opposite direction to the members of the other series, the shaft having a series of radial openings communicating with each series, a valve slidable in the shaft for closing either series, means for moving the valve, the rotor having means for discharging the exhaust motive fluid.

JAMES MACKEY.

Witnesses:
W. E. CARVER,
CHARLES T. WHITAKER.

---

Copies of this patent may be obtained for five cents each, by addressing the "Commissioner of Patents, Washington, D. C."